United States Patent [19]

Thompson et al.

[11] 4,014,669
[45] Mar. 29, 1977

[54] SELF-LOCKING DRIFT ELIMINATOR

[75] Inventors: Stanley E. Thompson; Joseph Michael Schwinn, both of Healdsburg, Calif.

[73] Assignee: Ecodyne Corporation, Lincolnshire, Ill.

[22] Filed: Dec. 24, 1975

[21] Appl. No.: 644,273

[52] U.S. Cl. .............................. 55/257 PV; 55/440; 261/DIG. 77
[51] Int. Cl.² ........................................ B01D 45/06
[58] Field of Search .... 55/257 R, 257 PV, 257 QV, 55/257 MP, 257 PP, 440, 442–446, 490, DIG. 37; 261/DIG. 11, DIG. 77; 52/667; 403/347; 211/186; 98/121 R

[56] References Cited
UNITED STATES PATENTS

| | | |
|---|---|---|
| 1,603,878 | 10/1926 | Smith ................................. 55/444 |
| 1,866,193 | 7/1932 | Coutant ............................... 55/444 |
| 2,371,921 | 3/1945 | Tucker ................................. 52/667 |
| 2,583,171 | 1/1952 | Green et al. ......................... 55/444 |
| 2,892,509 | 6/1959 | Baker et al. ......................... 55/443 |
| 3,224,175 | 12/1965 | Beach .................................. 55/440 |
| 3,248,837 | 5/1966 | Newell et al. ..................... 98/121 R |
| 3,748,832 | 7/1973 | Furlong et al. ................. 55/257 PV |
| 3,850,595 | 11/1974 | Garcia et al. .................. 55/257 PV |

Primary Examiner—Frank W. Lutter
Assistant Examiner—David L. Lacey
Attorney, Agent, or Firm—Joel E. Siegel; Charles M. Kaplan

[57] ABSTRACT

A drift eliminator assembly for a liquid cooling tower employs deformable resilient drift eliminator blades which snap into mounting slots and are held in place without fasteners or a bonding agent.

10 Claims, 7 Drawing Figures

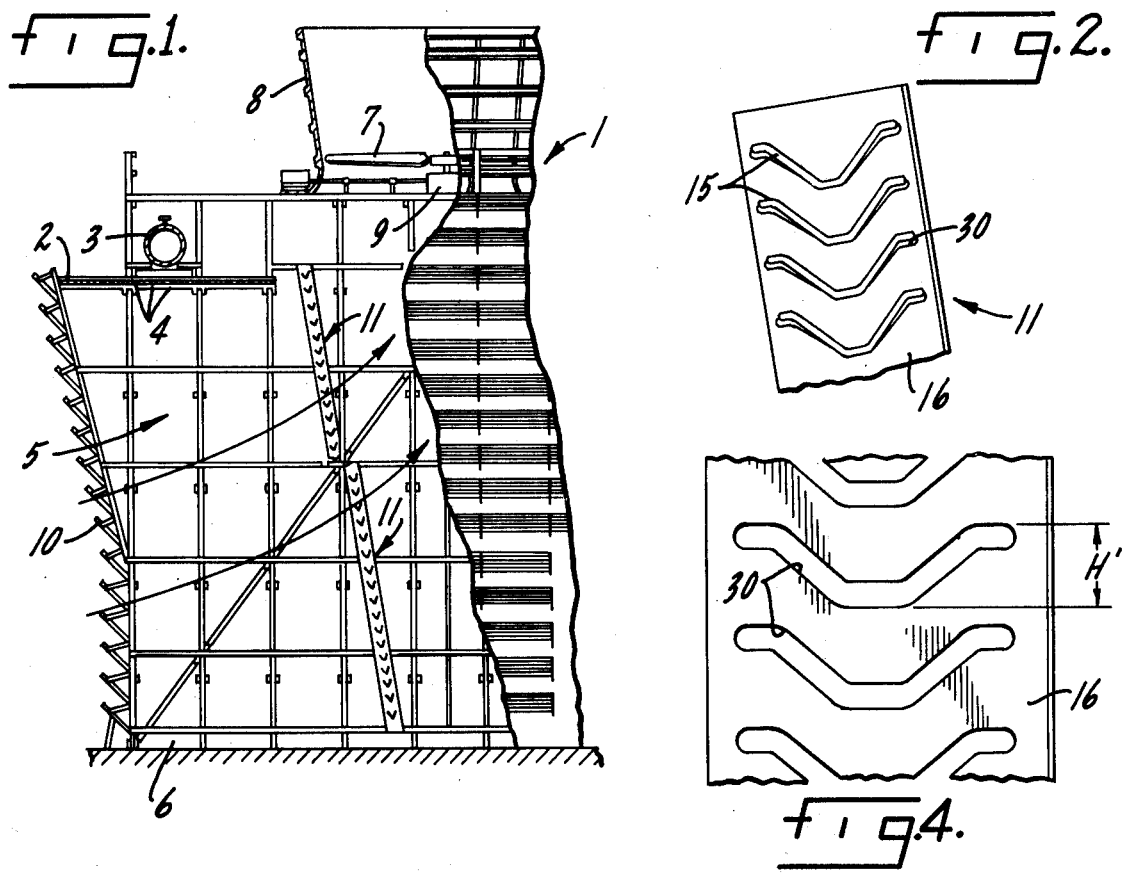
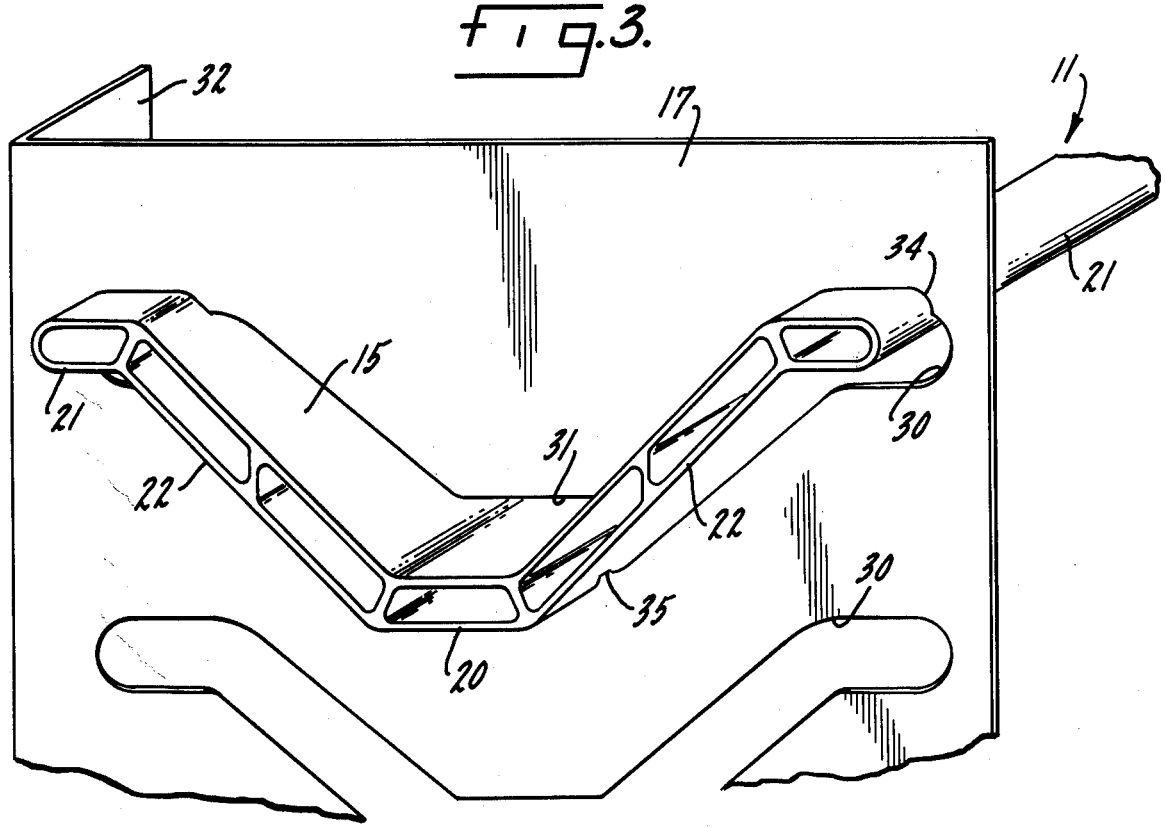

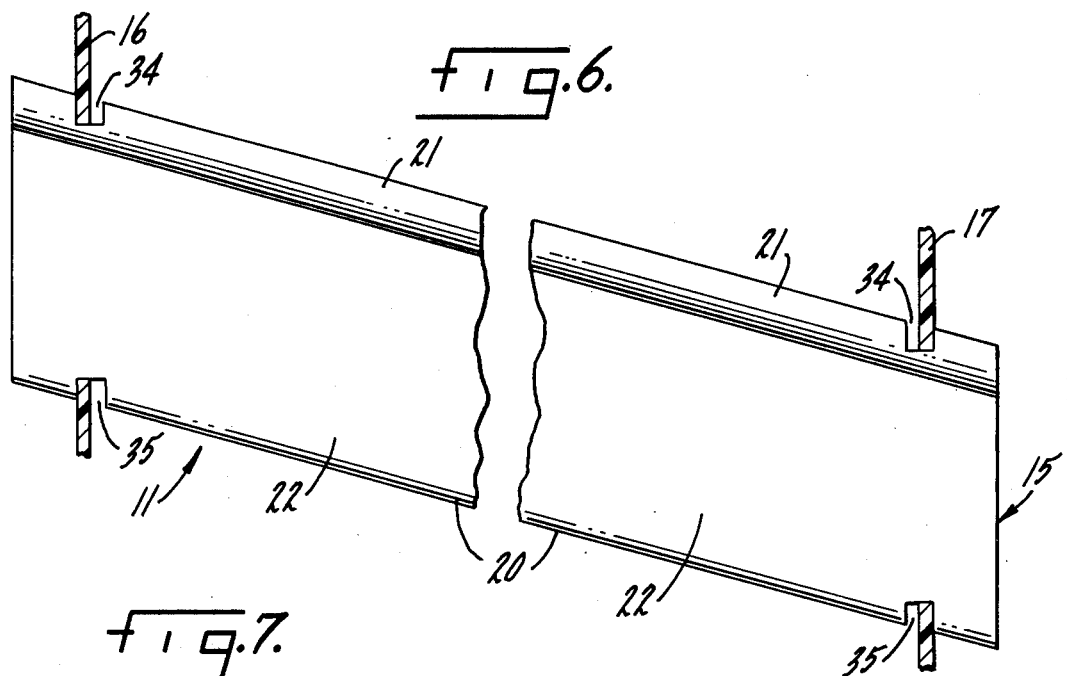
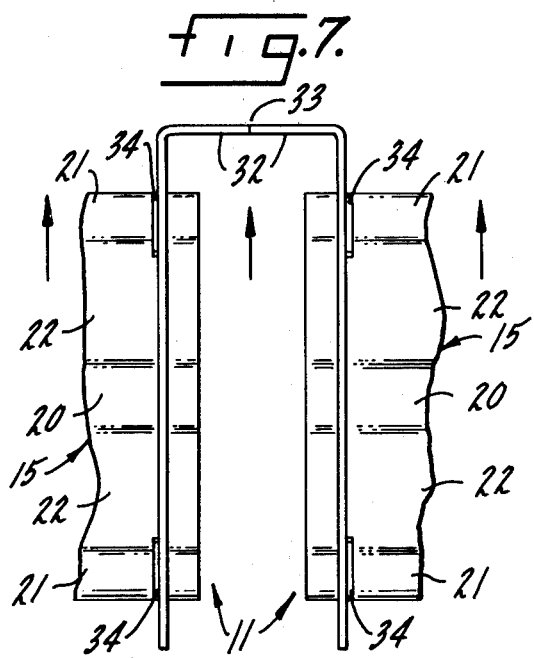
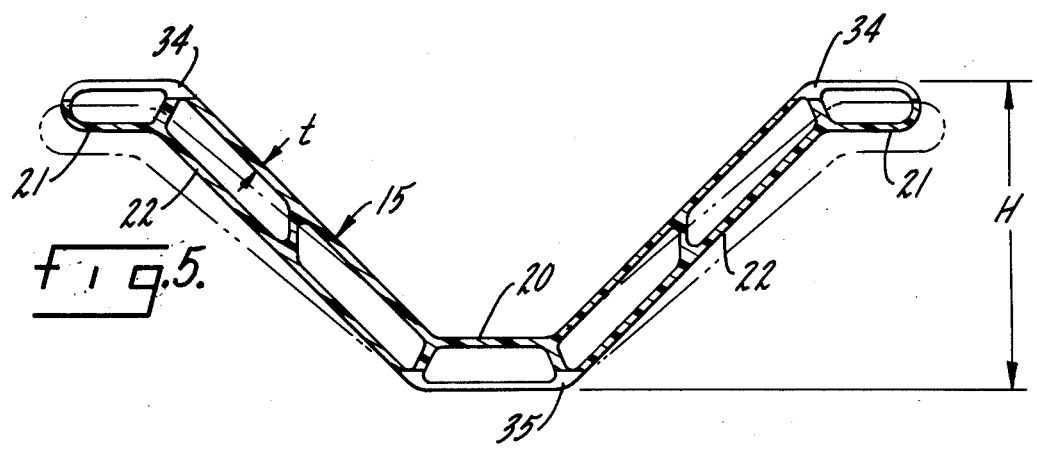

SELF-LOCKING DRIFT ELIMINATOR

BACKGROUND OF THE INVENTION

This invention relates to liquid cooling towers and more particularly to an improved drift eliminator assembly for such towers.

In cooling towers wherein falling water is cooled by moving air therethrough, too much water will be lost in the air unless means is provided in the path of the exiting air to remove such water and return the water to a point of collection. Reference to U.S. Pat. Nos. 3,468,521 and 3,748,832, both assigned to the same assignee as this invention, will reveal the structure and operation of cooling towers and drift eliminators upon which this invention is an improvement. Although such prior art drift eliminator assemblies satisfactorily remove entrained water, procedures for putting them together are complicated and expensive. For example, special fasteners and bonding agents are required, and time consuming alignment of parts is necessary. Also, removal of blades for repair or replacement in the field is cumbersome because of the complicated or inflexible manner in which they are fastened to the supporting structure.

SUMMARY OF THE INVENTION

Accordingly, it is an object of this invention to provide a liquid cooling tower with an improved drift eliminator assembly.

Another object is to provide a water cooling tower with a flexible, resilient drift eliminator that snaps into place.

Another object is to provide a drift eliminator that is held in place without separate fasteners or bonding agents.

Another object is to provide a liquid cooling tower including a drift eliminator that is strong, durable, low-cost, and which does not possess defects found in corresponding prior art devices.

Another object is to provide a drift eliminator which can be easily assembled or disassembled in either a factory or the field.

Another object is to provide a drift eliminator assembly in which the blades are firmly held in their supporting structure.

Still other objects and advantages of this invention will be revealed in the specification and claims, and the scope of the invention will be set forth in the claims.

Briefly stated, according to one aspect of the invention, drift eliminator blades are deformed and then snapped into place or removed from supporting structure because of their inherent elasticity and relative dimensions, without requiring the use of separate fasteners or bonding agents.

DESCRIPTION OF THE DRAWINGS

FIG. 1 is a partially broken-away, side view of a preferred embodiment of the invention.

FIG. 2 is a partially broken-away, enlarged, side view of the drift eliminator assembly of FIG. 1.

FIG. 3 is a still larger, partially broken-away, perspective view of the assembly of FIG. 2.

FIG. 4 is an enlarged, partially broken-away, end view of the support means of the assembly of FIG. 2.

FIG. 5 is an enlarged, cross-sectional view of a drift eliminator blade taken in the plane of its notches.

FIG. 6 is a cross-sectional, broken-away, side view of a drift eliminator assembly.

FIG. 7 is a broken-away, top view of adjacent drift eliminator assemblies in accord with this invention.

DESCRIPTION OF A PREFERRED EMBODIMENT

FIG. 1 shows a crossflow cooling tower 1 having a water distribution pan 2 at its upper end. Water to be cooled is pumped thru inlet pipe 3 into pan 2 from which it discharges under the influence of gravity through suitable metering outlets 4 into a fill or packing chamber 5. After falling through and over any suitable fill or packing material (not shown) cooled water is collected in basin 6 from which it is removed for recycling or disposal. Fan 7 rotated in stack 8 by drive means 9 draws air through tower 1 for upward discharge out of stack 8. Air enters tower 1 through openings defined by louvers 10 on the outer sidewall of the tower. Air passes through the fill or packing and falling water in chamber 5 and then through drift eliminator assemblies 11 before entering stack 8, as indicated by arrows in FIG. 1.

As water falls through chamber 5 it is broken into droplets by splashing on the fill, and it also forms a film on the fill. Cooling occurs essentially by evaporation and by heat transfer from the water surface to the air. Water droplets also become entrained in the air stream, and it is undesirable to permit their escape from the tower. Drift eliminator assemblies 11 in accord with this invention prevent these air borne water droplets from escaping through stack 8 by redirecting the air flow in such a manner that entrained droplets impinge and collect on drift eliminator blades, from which the water drains down through the tower to basin 6.

FIGS. 2 and 3 show assembly 11 having drift eliminator blades 15 held in slots 30 of rigid support plate means 16 and 17. FIG. 3 shows each blade 15 to be an elongated, hollow integral body having a flat central portion 20, a pair of flat tips 21 generally parallel to portion 20, and wing portions 22 intersecting tips 21 and portion 22 at an angle of approximately 45°. FIG. 5 shows a blade 15 in its predetermined, undeformed, cross-sectional shape in which the distance or height H between the upper surface of tips 21 and the under surface of portion 20 is at a maximum. Blades 15 should be made from strong, light-weight, resilient, corrosion-resistant material, such as metals like aluminum or plastics like polyvinyl-chloride and polypropylene. The material and dimensions selected for blades 15 must provide sufficient rigidity that blades 15 are capable of supporting their own weight plus the weight of water impinged thereon, in a high velocity air stream. The material must also be sufficiently flexible to permit wings 21 to be deflected downwardly and twisted into a temporary, distorted shape, as indicated in phantom in FIG. 5, and sufficiently resilient to cause wings 21 to snap back so as to hold blades 15 firmly in place in plate 16. A preferred material for blades 15 is class 12454-c polyvinyl-chloride, and the thickness of the walls of blades 15 should be approximately 0.028 inches.

FIG. 4 shows upper plate 16 having a series of identical spaced slots 30 of generally the same shape as blades 15. However, slots 30 are slightly larger than the cross-sectional dimensions of blades 15 to permit passage of one blade 15 through each slot 30, and the distance or height H' between the material of plate 16 defining the upper edges of each slot 30 and the material defining the lower edge of each slot 30 is less than the height H of blades 15. Lower plates 17 are identical to upper plates 16 except that their slots 30 are enlarged at 31 to permit passage of impinged water between plates 17 and blades 15, and thus facilitate drainage from the lowermost end of each blade when plates 16 and 17 are offset with respect to the vertical, as shown in FIG. 6. An end flange 32 adds rigidity to plates 16 and 17. As shown in FIG. 7, flanges 32 on the plates of adjacent assemblies 11 should abut as at 33 to prevent water droplets from escaping between the assemblies. The air flow direction is indicated by arrows in FIG. 7.

Each blade 15 has adjacent each of its ends, three notches located in the same cross-sectional plane for receiving and forming an interference fit with the slot 30 in which such end is received. Each tip 21 has a notch 34 therein, and each central portion 20 has a notch 35 therein. As shown in FIG. 6, notches 34 and 35 are substantially wider than the thickness of the material from which plates 16 and 17 are made in order to facilitate positioning of blades 15 at an angled position, such as 15° with the horizontal, that causes draining of impinged water from the lower end of each blade, and also to facilitate removal of the blades for repair or replacement. The notches 35 also form additional drainage openings for water at the lower end of each blade 15.

To connect blades 15 to plates 16 and 17, either or both wing portions 22 at a blade end are spread and twisted from the predetermined cross-sectional shape shown in solid lines in FIG. 5 to a distorted shape in which their height is reduced, as indicated in phantom in FIG. 5. A distorted end of each blade 15 is passed through a slot 30 until notches 34 and 35 are aligned in the plane of the plate. When the force distorting the blade end is released, the inherent resiliency of the material from which blades 15 are made causes wings 22 and central portion 20 to move towards their predetermined cross-sectional shape until they engage the material defining a plate 16 or 17 adjacent slots 30. However, because H' is less than H, the blade ends are restrained from returning to their predetermined cross-sectional shape, thus keeping blades 15 in tension by the interference fit between tips 21 and central portion 20 and plate 16 or 17. In a preferred embodiment, H was 2.00 inches and H' was 1.75 inches. The tensile modulus of elasticity of the material defining blades 15 should be at least 400,000 p.s.i. so that blades 15 will snap into slots 30 with sufficient holding force to eliminate the need for fasteners or bonding agents. A blade 15 constructed as disclosed herein can support its own length for at least 62 inches between plates 16 and 17, as well as the weight of impinged water in air velocities of at least 10 f.p.s.

It has thus been shown that a drift eliminator assembly in accord with this invention can be made from corrosion-resistant, light-weight material, yet not require the use of fasteners or bonding agents which greatly increase the time and expense required to construct or repair the assembly in both the factory and the field. Also, the members from which this drift eliminator assembly are made can be fabricated by extruding or other economical production techniques.

While the present invention has been described with references to a particular embodiment, it is not intended to illustrate or describe all of the equivalent forms or ramifications thereof. For example, the invention is applicable to counterflow or to natural draft cooling towers, in addition to the mechanical draft, cross flow tower shown herin. Also, the words used are words of description rather than limitation, and various changes may be made without departing from the spirit or scope of the invention disclosed herein. For example, words such as height, width, or upper and lower may be inappropriate depending on the angular orientation of the blades. It is intended that the appended claims cover all such changes as fall within the true spirit and scope of the invention.

What is claimed is:

1. A liquid cooling tower having means for delivering liquid and for causing such liquid to fall within said tower, an air inlet, an air outlet, means for causing air to flow from said inlet to said outlet so as to intersect the liquid falling within the tower, and an improved drift eliminator assembly within the tower that removes droplets of liquid entrained in the air before discharge of the air through said outlet, comprising:
  a. a plurality of longitudinally extending drift eliminator blades of predetermined cross-sectional shape made from a resilient material that is sufficiently rigid to enable each blade to support its own weight, yet is sufficiently flexible to permit each blade to be deflected into a temporary, distorted shape during attachment in said assembly, and each blade having notches therein;
  b. support means of rigid material for receiving said blades having slots that are larger than said cross-sectional shape so as to permit passing of a blade through each slot when such blade is deflected into said temporary, distorted shape; and
  c. said notches being aligned with and receiving the material defining said slots so as to form an interference fit between said support means and said blades upon return of said blades toward said predetermined shape after deformation and insertion of said blades through said slots.

2. The invention defined in claim 1 wherein each blade has three notches located in the same cross-sectional plane.

3. The invention defined in claim 2 wherein the cross-sectional plane is adjacent an end of each blade.

4. The invention defined in claim 1 wherein said slots are shaped generally the same as said predetermined cross-sectional shape of said blades.

5. The invention defined in claim 1 wherein said blades have a maximum height when in said predetermined cross-sectional shape, and the height of said slots is less than said maximum height of said blades.

6. A water cooling tower having means for delivering water and for causing such water to fall within said tower, an air inlet, an air outlet, means for causing air to flow from said inlet to said outlet in a generally horizontal direction so as to intersect the water falling within the tower, and an improved drift eliminator assembly within the tower that removes droplets of water entrained in the air before discharge of the air through said outlet, comprising:
  a. a plurality of longitudinally extending drift eliminator blades of predetermined cross-sectional shape having a maximum height and being made from resilient material that is sufficiently rigid to enable each blade to support its own weight, yet is sufficiently flexible to permit each blade to be deflected into a temporary, distorted shape in which said maximum height is reduced during attachment in said assembly, and each blade having at least three separate notches located in the same cross-sectional plane adjacent each of its ends;

b. support plates of rigid material for said blades having slots shaped generally the same as said predetermined cross-sectional shape so as to permit passing of a blade through each slot when such blade is deflected into said temporary, distorted shape; and c. the height of said slots being less than said maximum height so that when said notches are aligned with and receive the material defining said slots an interference fit is formed between said support plates and said blades upon return of said blades toward said predetermined shape after deformation and insertion of said blades through said slots.

7. The invention defined in claim 6 further including a flange extending along one edge of each support plate.

8. The invention defined in claim 7 wherein the flanges of adjacent drift eliminator assemblies in said tower abut to prevent escape of water droplets therebetween.

9. The invention defined in claim 6 wherein said notches are wider than said rigid material and thereby facilitate drainage of impinged water from said blades.

10. The invention defined in claim 9 wherein the support plates of said assembly are vertically offset to cause said blades to be angled with respect to the horizontal, and the slots on the lower plates are enlarged to further facilitate drainage of impinged water from said blades.

* * * * *